United States Patent [19]

Anderson et al.

[11] 4,235,742
[45] Nov. 25, 1980

[54] BASE FOR DEFOAMING COMPOSITIONS

[75] Inventors: Roy S. Anderson, Broomall; Oscar J. Pladek, Downingtown, both of Pa.

[73] Assignee: PQ Corporation, Valley Forge, Pa.

[21] Appl. No.: 18,966

[22] Filed: Mar. 9, 1979

Related U.S. Application Data

[63] Continuation-in-part of Ser. No. 863,276, Dec. 22, 1977, abandoned.

[51] Int. Cl.$^3$ .................... B01D 19/04; B32B 5/16; B32B 17/02
[52] U.S. Cl. .................... 252/358; 252/321; 427/221; 428/405; 428/406
[58] Field of Search ............ 252/321, 358; 427/221; 106/308 Q; 428/405, 406

[56] References Cited

U.S. PATENT DOCUMENTS

| | | | |
|---|---|---|---|
| 2,886,460 | 5/1959 | Alexander et al. | 427/221 X |
| 3,030,215 | 4/1962 | Veatch et al. | 106/40 R |
| 3,076,768 | 2/1963 | Boylan | 252/321 X |
| 3,365,315 | 1/1968 | Beck et al. | 106/52 X |
| 3,408,306 | 10/1968 | Boylan | 252/321 |
| 3,796,777 | 3/1974 | Netting | 264/13 |
| 4,008,173 | 2/1977 | Davis | 252/358 |

*Primary Examiner*—Richard D. Lovering
*Attorney, Agent, or Firm*—Ernest G. Posner; J. S. Stephen Bobb; Fred C. Philpitt

[57] ABSTRACT

Flaked or plate-like materials that contain silicate were found to be useful as bases for the manufacture of defoaming compositions. Hollow microspheres with largely siliceous surfaces are crushed to form flaked fragments which are rendered hydrophobic by coating with a silane or silicone. The hydrophobized fragments are then dispersed in a water insoluble organic liquid to complete preparation of the defoamer. Especially useful are hollow microsphere fragments containing sodium silicate and a polysalt.

23 Claims, No Drawings

BASE FOR DEFOAMING COMPOSITIONS

This application is a continuation-in-part of our copending application Ser. No. 863,276 filed Dec. 22, 1977 and now abandoned.

BACKGROUND OF THE INVENTION

This invention relates to defoaming of aqueous systems. In particular, the invention provides a hydrophobic solid that does not require intensive treatment to disperse it in a water insoluble liquid for use.

Defoamers for aqueous systems often consist of hydrophobic particles dispersed in a hydrophobic liquid. The hydrophobic particles are prepared by coating a generally hydrophilic material with a silane or silicone oil and curing in the required manner. Hydrophilic particles such as silica and alumino silicate have proved successful base materials for use in these systems. To complete preparation of the defoamer, the hydrophobic particles are dispersed in a water insoluble organic liquid such as a mineral oil by ball milling or other intensive methods. U.S. Pat. Nos. 3,408,306 and 4,008,173 disclose defoaming compositions and the methods by which such materials are prepared and used.

It is an object of this invention to provide a new base for the preparation of defoamers. It is also an object of this invention to provide a method for preparing defoamers that does not require intensive mixing or milling.

SUMMARY OF THE INVENTION

Plate-like materials such as crushed hollow microspheres were found to be effective base materials for defoamers for aqueous systems. Hollow spheres consisting of sodium silicate and a polysalt which are marketed under the registered trademark of Q-CEL ® by PQ Corporation are crushed and then rendered hydrophobic by treatment with a halo-silane or siloxane. Similar microspheres of largely siliceous composition are useful as well. The hydrophobic material is combined with a water insoluble organic liquid completing the preparation of the defoamer. High shear or milling is not required to disperse the hydrophobic particles in said organic liquid.

THE INVENTION

Plate-like materials are required as the solid base materials for the defoamers of our invention. We have found that fragments from crushed microspheres consisting mainly of silica or silicate, which are usually used as fillers, to be the most useful type of material. It appears that both fused and un-fused microspheres can be used in this invention.

The hollow microspheres that we prefer to crush, thereby forming the required flake or plate-like material, consist of sodium silicate and a polysalt such as ammonium pentaborate, sodium pentaborate and sodium hexametaphosphates. The hollow microspheres are formed by spray drying combined solutions of sodium silicate and the polysalt. The microspheres are 40 to 2000 microns in diameter and have 0.03 to 2.0 parts by weight (pbw) of polysalt per pbw of silicate. The water content is less than about 7% and the density is 4 to 20 lbs./ft.$^3$. The properties, composition and preparation of these materials is described in U.S. Pat. Nos. 3,794,503; 3,796,777; and 3,888,957; these patents are hereby incorporated by reference as descriptive of one raw material. Especially important in U.S. Pat. No. 3,794,503 in which microspheres are fully described. In addition, the components of the microspheres, sodium silicate and polysalt are specified. The descriptive material in column 3 of this patent include the requirements of the "polysalt" used in the microspheres used in our invention. In the context of the composition described in U.S. Pat. No. 3,794,503 and our present invention we consider "polysalts" to be those salts which when hydrolyzed have lowered anion to cation ratios. Alkali metal and ammonium polyborates and polyphosphates appear to be the most useful polysalts.

Hollow spheres consisting of various insoluble, fused glasses can also be crushed to provide useful plate-like materials. These materials are described in U.S. Pat. Nos. 2,978,340 and 3,030,215 which are hereby incorporated by reference as descriptive of another class of raw materials. The glass microspheres are discrete spheres of synthetic, fused, water-insoluble alkali metal silicate-based glass having diameters of 5 to 5000 microns. The insoluble glass systems include boro-silicate, zinc-silicate, magnesium-silicate and alumino-silicate.

U.S. Pat. No. 3,365,315 which is hereby incorporated by reference also describes other fused silicate glass microspheres of utility in our invention. These so-called glass bubbles are indicated as having diameters between 5 and 300 microns and a composition of at least 40% by weight of $SiO_2$, at least 5% by weight alkali metal oxide and about 5 to 50% by weight of at least one other constituent selected from those conventionally present as optional ingredients in glasses requiring an initial glass forming temperatures between 1200° and 1500° C. The glass bubbles are formed by reheating solid glass particles, thereby expanding them. The optional ingredients include BaO, MgO, SrO, ZnO, PbO, $TiO_2$, $MnO_2$, $SrO_2$, $B_2O_3$, $Al_2O_3$, $Fe_2O_3$, $Sb_2O_3$, $P_2O_5$ and $V_2O_5$.

A preferred composition being:

| | |
|---|---|
| $SiO_2$ | 60–80% by weight |
| $Na_2O$ | 5–16% by weight |
| CaO | 5–25% by weight |
| $K_2O + Li_2O$ | 0–10% by weight |
| $Na_2O + K_2O + LiO_2$ | 5–16% by weight |
| RO | 0–15% by weight |
| $RO_2$ | 0–20% by weight |
| $R_2O_5$ | 0–25% by weight |
| Fluorine | 0– 5% by weight | wherein RO represents bivalent metal oxides other than CaO, $R_2O$ represents metal oxides other than $SiO_2$, $R_2O_3$ represents trivalent metal oxides and $R_2O_5$ represents pentavalent metal oxides. The bubbles being formed by reheating solid glass particles at temperatures between 100° and 300° C. lower than the glass forming temperature of 1200° to 1500° C.

U.S. Pat. No. 4,063,916 hereby incorporated by reference discloses the preparation of fused hollow glass microspheres similar to those disclosed in U.S. Pat. No. 3,030,215.

The hollow microspheres can be crushed in any manner that does not result in the agglomeration or caking of the fragments. Air milling and other impact methods are useful. Methods that employ more than a moderate amount of pressure such as jaw crushers are of limited value. The important consideration in the crushing appears to be creating and maintaining plate-like features, crushing methods that provide fragments with a true particle density that is about 4 to 8 times greater than the true particle density of the microspheres appear best.

The microsphere fragments are rendered hydrophobic by treatment with a halo-silane, alkoxy-silane, acetoxy-silane, or a siloxane thereby forming a hydrophobic coating on the surface of the fragment. The patents mentioned hereinbefore in the Background section and U.S. Pat. Nos. 2,510,661; 2,870,109; 3,076,768 and 3,408,306, describe the methods whereby hydrophilic materials are rendered hydrophobic.

Silanes and siloxanes are used to provide hydrophobic surfaces. Alkyl, aryl, alkaryl and aralkyl halo-silanes are usually employed by exposing the microsphere fragments to their vapors. Alkyl, aryl, aralkyl and alicyclic polysiloxanes having viscosities of about 10 to 3000 centistokes are used by mixing the hydrophobic agent with the fragments and curing usually at elevated temperatures (230° to 320° C. for 4 to 24 hours). We commonly employ alkyl polysiloxanes and dimethylpolysiloxane is most frequently used. The amount of halo-silane or siloxane required to provide the desired performance is dependent upon the particle size and the active surface area of the fragments. We have found that about 2 to 30% by weight of the polysiloxane provides completely hydrophobic character. The hydrophobic particles then consist of 70 to 98% microsphere fragments and 2 to 30% hydrophobic agent.

The defoaming composition is completed by combining the hydrophobized fragments with a water insoluble organic liquid. These liquids can be selected from the group consisting of aliphatic, alicyclic and aromatic hydrocarbons and mixtures thereof. Examples of suitable liquids include vegetable oils, mineral oils, paraffin oils, naphthenic oils, kerosene and other petroleum fractions. The final defoamer composition is about 3 to 30% hydrophobized sphere fragments and 70 to 97% organic liquid. Non-intensive stirring is all that is necessary to disperse the solid material in the liquid. After standing there is considerable settling of the solid but simple stirring or shaking is all that is necessary to redisperse the solids.

The finished composition is an efficient defoamer when prepared in the manner described. If the plate-like hydrophobic microsphere fragments are ball milled into the organic liquid instead of using the less intensive method described, the efficiency of the composition is reduced. We have also found that the method of hydrophobizing the hollow microspheres and using them as the solid in the defoamer is not very satisfactory. If hydrophobic microspheres are crushed and used in a defoamer the efficiency is not as great as that provided by the product of our preferred method.

EXAMPLES

The following Examples illustrate certain embodiments of our invention. The Examples are not intended as descriptive of the limits or the scope of the invention. The scope is fully defined in the specification and claims. The proportions used are in parts by weight (pbw) or percent by weight (%) unless otherwise indicated.

Defoaming performance was determined by measuring the foam height generated with an aqueous black liquor obtained from a paper company at 70° C. Foam was generated by recirculating the system and providing maximum agitation during the circulation. The foam height was measured in a graduated cylinder.

EXAMPLE 1

This Example illustrates preparation of defoamers according to the teachings of this invention. The microspheres used in this Example were prepared as described in Example 1 of U.S. Pat. No. 3,796,777. The spheres contained 3.3% water had a true particle density of 17 lbs./ft.$^3$ and the particle size was indicated as between smaller than 50 mesh but larger than 200 mesh. The hollow microspheres were crushed by impacting in a Waring Blender for 10 minutes. The true particle density had increased to 105 lbs./ft.$^3$. The microspheres were hydrophobized with a dimethylpolysiloxane fluid with a viscosity of 50 centistokes. The crushed microspheres were treated with 2, 4, 6, 8 and 10% of the silicone oil by tumbling for 2 hours and then curing at 300° C. for 20 hours. All samples showed hydrophobic character when mixed with water. The cured materials were combined with Gulf 560 oil, a mineral oil, using 10 pbw of the hydrophobic fragments and 90 pbw of the oil.

These defoamer compositions were tested as previously described and foam heights of 170 or less were generated in 120 seconds while foam heights of over 280 were generated in less than 30 seconds for the black liquor without defoamer. A foam height of 155 was generated in 120 seconds when a commercial defoamer was used.

This Example illustrates the preparation of excellent defoamers using the crushed microspheres and dispersing the hydrophobic fragments in the organic liquid without intensive milling.

EXAMPLE 2

This Example illustrates the behavior of defoamers prepared when the hydrophobic sphere fragments are ball milled into the Gulf 560 oil. Hydrophobic sphere fragments were prepared as described in Example 1. They were incorporated into the Gulf 560 oil by ball milling for 4 hours. These materials were tested as defoamers and gave foam heights of 170 to 230.

These results when compared with those of Example 1 indicate that defoamers prepared with hydrophobized microsphere fragments are most effective when blended as opposed to milling.

EXAMPLE 3

The microspheres were treated with 6% of the silicone oil without crushing and combined with the Gulf 560 oil. The foam height was about 250 after 120 seconds. When the hydrophobized spheres were ball milled into the mineral oil for 4 hours the foam height was between 240 and 280 after about 100 seconds.

EXAMPLE 4

The preparatory runs and tests described in Example 1 were repeated using the crushed microspheres described in U.S. Pat. No. 3,030,215 as the raw material. The foaming test results are comparable to those recited in Example 1.

EXAMPLE 5

The preparatory runs and tests described in Example 1 were repeated using the crushed microspheres of U.S. Pat. No. 3,365,315 as the raw material. The foaming test results are comparable to those recited in Example 1.

We claim:

1. A hydrophobic defoamer base suitable to disperse in a water insoluble organic liquid to form a defoamer effective in aqueous systems, said base consisting of: hydrophobic plate-like fragments of crushed microspheres, said microspheres consisting of sodium silicate and a polysalt, and said fragments being rendered hydrophobic by coating with 2 to 30% of a halo-silane or a siloxane and cured by heating at 230° to 320° C. for 4 to 24 hours, wherein said polysalt is an alkali metal polyborate, an ammonium polyborate, an alkali metal polyphosphate or an ammonium polyphosphate.

2. The defoamer base of claim 1 wherein said microspheres have 0.03 to 2.0 parts by weight of polysalt selected from the group consisting of ammonium pentaborate, sodium pentaborate and sodium hexametaphosphate per part by weight of sodium silicate; a water content of less than about 7% and a density of 4 to 20 lbs./ft.$^3$.

3. The defoamer base of claim 1 wherein the fragments derived from crushing said microspheres have densities of 4 to 8 times the density of the microspheres.

4. The defoamer base of claim 1 wherein the halo-silane is selected from the group consisting of alkyl, aryl, alkaryl and aralkyl halo-silanes.

5. The defoamer base of claim 1 wherein the siloxane is selected from the group consisting of alkyl, aryl, aralkyl and alicyclic polysiloxanes having viscosities of 10 to 3000 centistokes.

6. The defoamer base of claim 5 wherein the siloxane is dimethylpolysiloxane.

7. A hydrophobic defoamer base suitable to disperse in a water insoluble organic liquid to form a defoamer effective in aqueous systems, said base consisting of: hydrophobic plate-like fragments of crushed microspheres, said fragments being rendered hydrophobic by coating with 2 to 30% of a halo-silane or a siloxane and cured by heating at 230° to 320° C. for 4 to 24 hours wherein said microspheres have 0.03 to 2.0 parts by weight of a polysalt selected from the group consisting of ammonium pentaborate, sodium pentaborate and sodium hexametaphosphate per part by weight of sodium silicate; a water content of less than about 7% and a density of 4 to 20 lbs./ft$^3$.

8. The defoamer base of claim 7 wherein the fragments derived from crushing said microspheres have densities of 4 to 8 times the density of the microspheres.

9. The defoamer base of claim 7 wherein the halo-silane is selected from the group consisting of alkyl, aryl, alkaryl and aralkyl halo-silanes.

10. The defoamer base of claim 7 wherein the siloxane is selected from the group consisting of alkyl, aryl, aralkyl and alicyclic polysiloxanes having viscosities of 10 to 3000 centistokes.

11. The defoamer base of claim 10 wherein the siloxane is dimethylpolysiloxane.

12. A hydrophobic defoamer base suitable to disperse in a water insoluble organic liquid to form a defoamer effective in aqueous systems, said base consisting of: hydrophobic plate-like fragments of crushed microspheres, said microspheres consisting of synthetic, fused, water insoluble alkali metal silicate-based glass, and said fragments being rendered hydrophobic by coating with 2 to 30% of a halo-silane or a siloxane and cured by heating at 230° to 320° C. for 4 to 24 hours.

13. The defoamer base of claim 12 wherein the alkali metal silicate-base glass is a boro-silicate, a zinc-silicate, a magnesium silicate or an alumino-silicate.

14. The defoamer base of either of claims 12 or 13 wherein the fragments derived from crushing said microspheres have densities of 4 to 8 times the density of the microspheres.

15. The defoamer base of either of claims 12 or 13 wherein the halo-silane is selected from the group consisting of alkyl, aryl, alkaryl and aralkyl halo-silanes.

16. The defoamer base of either of claims 12 or 13 is selected from the group consisting of alkyl, aryl, aralkyl and alicyclic polysiloxanes having viscosities of 10 to 3000 centistokes.

17. The defoamer base of claim 16 wherein the siloxane is dimethylpolysiloxane.

18. A hydrophobic defoamer base suitable to disperse in a water insoluble organic liquid to form a defoamer effective in aqueous systems, said base consisting of: hydrophobic plate-like fragments of crushed microspheres, said microspheres being of fused glass consisting of at least 40% by weight of $SiO_2$, at least 5% by weight of alkali metal oxide and about 5 to 50% by weight of at least one other constituent selected from those conventionally present as optional ingredients in glasses requiring an initial glass forming temperature between 1200° and 1500° C., and said fragment being rendered hydrophobic by coating with 2 to 30% of a halo-silane or a siloxane and cured by heating at 230° to 320° C. for 4 to 24 hours.

19. A hydrophobic defoamer base suitable to disperse in a water insoluble organic liquid to form a defoamer effective in aqueous systems, said base consisting of: hydrophobic plate-like fragments of crushed microspheres, said microspheres are fused glass bubbles formed by reheating solid glass particles thereby expanding them, said glass particles having a composition of:

| | |
|---|---|
| $SiO_2$ | 60–80% by weight |
| $Na_2O$ | 5–16% by weight |
| CaO | 5–25% by weight |
| $K_2O + LiO_2$ | 0–10% by weight |
| $Na_2O + K_2O + Li_2O$ | 5–16% by weight |
| RO | 0–15% by weight |
| $RO_2$ | 0–20% by weight |
| $R_2O_5$ | 0–25% by weight |
| Fluorine | 0–5% by weight | wherein, RO represents bivalent metal oxides other than CaO, $R_2O$ represents tetravalent metal oxides other than $SiO_2$, $R_2O_3$ represents trivalent metal oxides and $R_2O_5$ represents pentavalent metal oxides, said glass particles being reheated and expanded at temperatures 100° to 300° C. lower than the glass forming temperature of 1200° to 1500° C., and said fragments being rendered hydrophobic by coating with 2 to 30% of a halo-silane or a siloxane and cured by heating at 230° to 320° C. for 4 to 24 hours.

20. The defoamer base of either of claims 18 or 19 wherein the fragments derived from crushing said microspheres have densities of 4 to 8 times the density of the microspheres.

21. The defoamer base of either of claims 18 or 19 wherein the halo-silane is selected from the group consisting of alkyl, aryl, alkaryl and aralkyl halo-silanes.

22. The defoamer base of either of claims 18 or 19 wherein the siloxane is selected from the group consisting of alkyl, aryl, aralkyl and alicyclic polysiloxanes having viscosities of 10 to 3000 centistokes.

23. The defoamer base of claim 22 wherein the siloxane is dimethylpolysiloxane.

* * * * *